H. C. EGERTON.
ELECTRIC CABLE.
APPLICATION FILED FEB. 9, 1911.

1,073,596.

Patented Sept. 23, 1913.
3 SHEETS—SHEET 2.

Witnesses:
O. D. M. Guthe
Irving MacDonald

Inventor:
Henry C. Egerton.
by [signature], Atty.

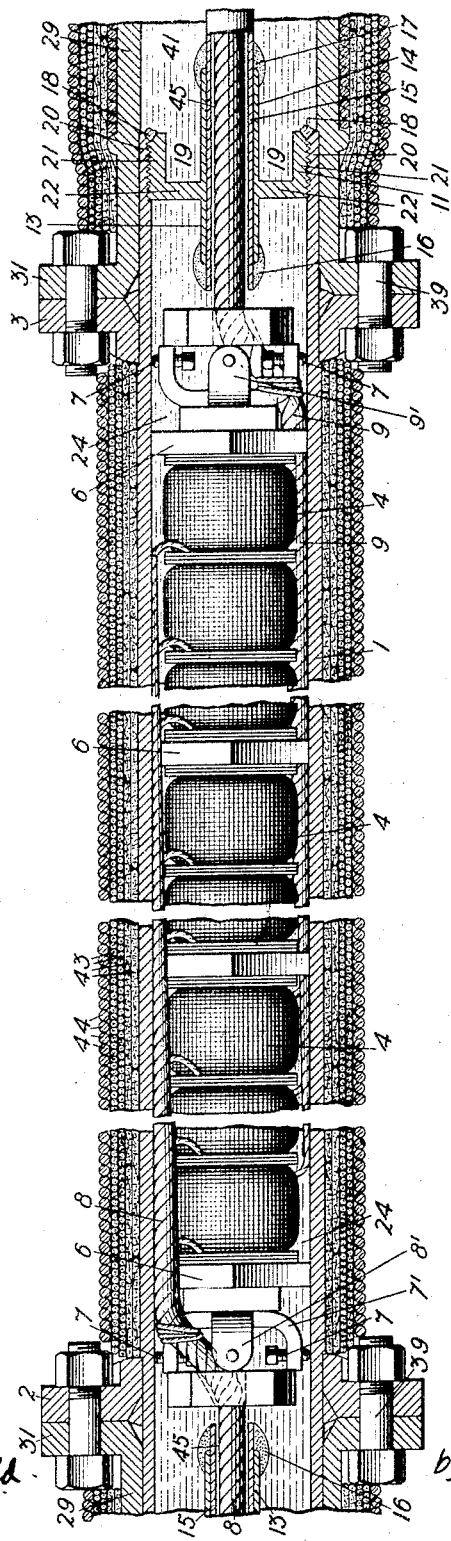

UNITED STATES PATENT OFFICE.

HENRY C. EGERTON, OF RIDGEWOOD, NEW JERSEY, ASSIGNOR TO WESTERN ELECTRIC COMPANY, OF NEW YORK, N. Y., A CORPORATION OF ILLINOIS.

ELECTRIC CABLE.

1,073,596.

Specification of Letters Patent.   Patented Sept. 23, 1913.

Application filed February 9, 1911. Serial No. 607,609.

*To all whom it may concern:*

Be it known that I, HENRY C. EGERTON, citizen of the United States, residing at Ridgewood, in the county of Bergen and State of New Jersey, have invented a certain new and useful Improvement in Electric Cables, of which the following is a full, clear, concise, and exact description.

This invention relates to submarine cables and more particularly to cables which are "loaded" in accordance with the well-known Pupin system. The loading coils may be assembled in substantial metallic protective cases and connected into the cable at intervals to form a part thereof.

It is the object of this invention in general to provide an improved construction for loading coil cases and for cable joints whereby the coils within the case or the cable conductors at the joints are protected from moisture and mechanical injury.

In accordance with one feature of the invention a junction member for uniting severed sections of the cable is made in the form of a pipe, preferably longitudinally split, and provided with devices for gripping or clamping the cable armor, together with means for securing these devices to the junction member. Such junction members may be used at each end of a loading coil case where they serve to protect the joints between stub ends of cable extending from the coil case and the main cable sections; or they may be used independently and in such use they serve to inclose and protect ordinary cable splices.

Another feature consists in the provision of specially formed end plugs which may be welded to the case after the coils and their connections are in place without danger of injury to any of the parts of the structure from heat.

In accordance with another feature of the invention the stubs formed of the cable leads extend respectively through short lengths of cable sheathing in the ends of the case, which sheathing is sufficiently greater in diameter than the inclosed stubs to provide annular passages for the entry of suitable moistureproof compound.

These and other features of the invention will be more particularly pointed out in the accompanying claims.

Figure 1:
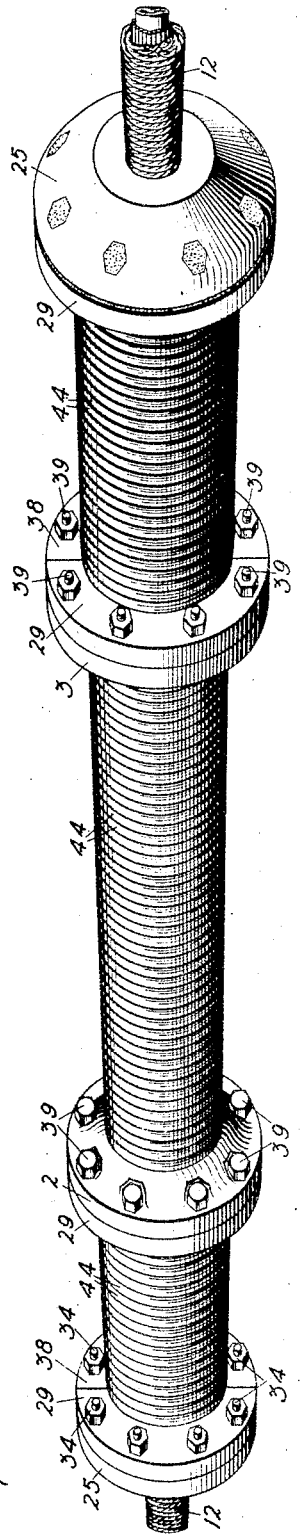
Figure 2:
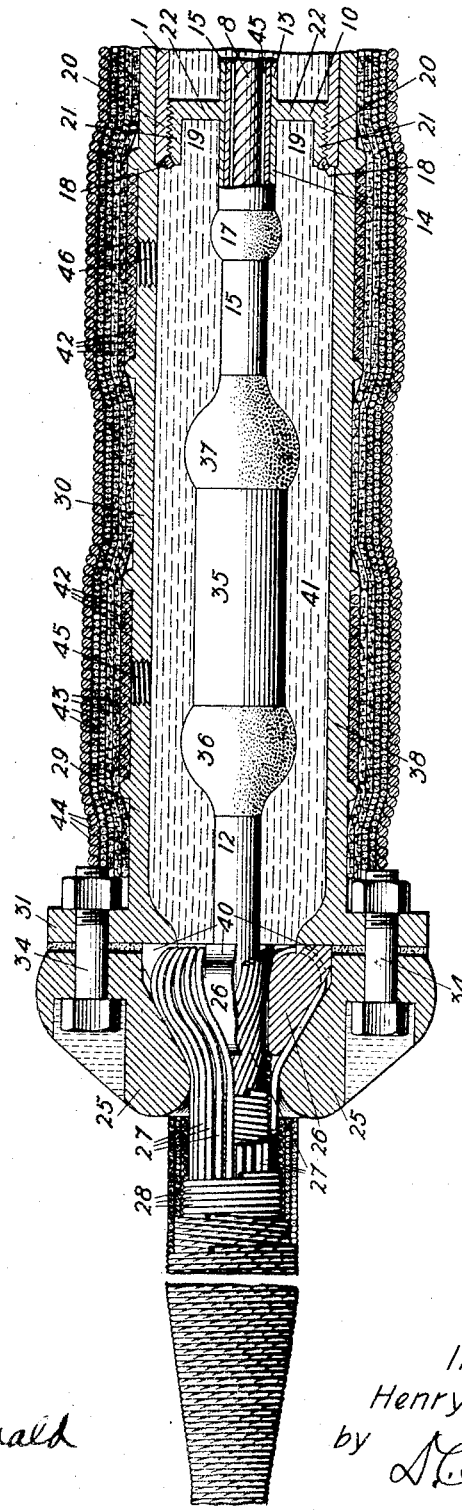

In the drawings—Figure 1 is a perspective view of the completed case inclosing the loading coils. Figs. 2 and 3 represent when placed together an enlarged longitudinal section of the left-hand portion of the completed case shown in Fig. 1, the part omitted being similar in all respects to the portion shown in Fig. 2.

The case 1 preferably consists of a length of heavy wrought iron pipe. A flange 2, 3 is preferably welded to the exterior of the pipe near each end. The loading coils 4 after being subjected to the various processes necessary to drive off moisture and prevent them from thereafter absorbing moisture, are slipped upon an axial support (not shown) which may be of wood, between blocks 6, also of wood, placed at intervals between the coils, the function of these blocks being to rest upon the interior face of the pipe and support the loading coils centrally within the case prior to the filling operation. Screws 7 in the legs 7' of the spiders 8', 9' when tightened serve to maintain the structure rigid within the case. A twisted cable stub 8, 9 is associated with each end of the case and so connected with the coils 4 that the winding of each coil terminates in a pair of conductors in each cable stub. These stubs extend to the exterior of the case 1 at its ends through plugs 10, 11, respectively, for connection with the ends of the cable sections 12.

Each plug 10, 11 in the present embodiment is cylindrical in form and provided with exterior screw threads which engage with coöperating threads on the interior of the respective end of the case 1. The opening in the plugs 10, 11 through which the respective cable stubs 8, 9 pass is cylindrical in form and its walls are prolonged or extended for a considerable length in both directions as at 13, 14 providing a comparatively long channel within which a short length of lead cable sheath 15 is inserted and connected thereto at each end by carefully wiped joints 16, 17. Referring to the plug shown in Fig. 2, the periphery 21 extends to the left of the part 22, which I shall for convenience of description refer to as the plane of the plug, and this peripheral portion encircles the prolongation 14, these parts 21 and 14 forming in effect concentric circular walls closed at the inner end by the part 22 just mentioned, thus providing an annular recess 19 for a purpose hereinafter fully set forth. These plugs are each preferably made of machine steel to avoid excessive electrolytic action attendant upon the use of brass or copper should the case be submerged in salt water, and the plug is wiped in two places 16, 17, as stated, to the sheath 15, one of which is outside and the other inside when the plug has been secured to the case 1, to materially reduce the liability of moisture entering the case 1 due to a single joint being imperfectly wiped, which liability is emphasized in a union with lead and steel. The plugs 10, 11 after having been threaded within the respective ends of the case are welded thereto. It is important that during this operation the heat incidental to the welding operation be confined to a very small region around the circumference 18 of the case 1 and not allowed to affect the lead sheath 15 and its wiped joints 16, 17, or the coils within the case. For this reason the plug is recessed as at 19 to enable the outside wiped joint 17 to be protected in any suitable manner, preferably by a water jacket, or asbestos sleeve slipped over the outwardly extending wall 14 and said splice, thus preventing the heat from radiating directly across, or the flame of the welding torch actually contacting with it, and to protect the inside wiped joint 16 and the lead sheath generally a water jacket may encircle the exterior surface 20 of the case 1, thus preventing the heat reaching the lead parts by conduction through the periphery 21 and connecting web 22 of the plug.

The loading coil cable stubs 8, 9 are of substantially smaller diameter than the lead sheaths 15 to provide a passage shown at 45 for a suitable moistureproof compound 24 which is allowed to flow in after the plugs 10, 11 have been welded to case 1. This or an equivalent construction is necessary, for the case must be welded before being completely filled with compound, for if the case were filled prior to the welding operation the heat incident thereto would boil the compound and the resultant gases would prevent a successful weld. The major portion of the case—that surrounding the coils 4—is, however, for convenience preferably filled before the plugs 10, 11 are attached, leaving the relatively smaller chambers immediately adjacent the plugs to be filled subsequent to the welding operation. The construction described moreover enables the air to be exhausted from the said chambers and the moistureproof compound allowed to flow in under the pressure of the atmosphere, which is a very desirable feature, since I am thereby enabled to totally fill the case with the compound, which would be impossible unless the air were exhausted due to the fact that the walls 13 of the passages, through which the compound flows, extend well into the case. This eliminates the possibility of moisture reaching the coils. In this condition the cases are shipped to the place of installation and during the process of laying the cable are interposed therein at predetermined intervals. A longitudinally-split metallic cylinder 30 is provided for each end of the containing case and is adapted to inclose and protect the splices 36, 37 between the projecting coil stubs and the respective cable sections and also to form a support for devices adapted to grip the cable armor, which is thus employed to take up mechanical strain and thereby protect the spliced joints and coil connections.

The operations incident to uniting one end of the case with the associated cable section, the other being similar, are as follows: A conical collar 25 and thimble 26 are slipped upon the section 12, the thimble being moved back on the cable a distance equal to the length of the cylinder 30 and the collar 25 a greater distance. The steel wires 27 which form the armor of the cable 12 are then stripped from the end of the section to this thimble, bent back over the same and securely lashed to the cable by a serving of galvanized steel wire 28. A portion of the lead sheath 15 protecting the loading coil stub 8 and of the sheath of the cable proper is cut away and the corresponding conductors spliced, a sleeve of lead 35 having been slipped over the cable end, which after the conductors are spliced is transferred to the spliced portion and secured thereover by a wiped joint 36, 37 at each side. The sections 29, 38 of the longitudinally-split cylinder 30 are then fitted to the case, making a telescopic joint therewith, the flange 31 coöperating with the flange 2 of the case and being secured thereto by bolts 39. The collar 25 is then moved over the thimble 26 and bolted at 34 to the cylinder 30. The tightening of bolts 34 forces the collar 25 toward the thimble 26 which in turn is held rigidly by four legs 40 bearing against the ends of the cylinder 30, thus securely clamping the armor wires 27 between the collar and thimble, the legs 40 providing between them curved surfaces, so that upon the tightening of the bolts 34, the armor wires are rigidly held between these curved surfaces and the coöperating curved surfaces of the inner part of the ring 25, thus saving them from abrasion. The chamber formed by the cylinder 30 is then filled with a moistureproof compound 41 through openings 45, 46 in the member 29, which may subsequently be stopped by plugs. The sections 29, 38 of the split cylinder 30 are then wound with steel wire 42 to afford greater rigidity. The entire structure may be served with some fibrous material shown at 43 and the whole thoroughly saturated with some waterproofing compound such as coal tar. As a further protection to this waterproofing a serving of galvanized steel wire 44 is applied.

I claim:

1. In combination, sections of electric cable, sheathing and armor therefor, an envelop within which said sections are united, devices for engaging said armor, and clamping means for securing said devices to said envelop, said clamping means also causing said devices to grip said armor.

2. In combination, sections of electric cable, sheathing and armor therefor, a casing adapted to be associated with said cable, a thimble, a collar, and clamping means for securing said collar to said casing, said clamping means also causing the said collar and said thimble to grip said armor between them.

3. In combination, a junction-member, a collar secured thereto, and a thimble between said junction-member and collar, said thimble having feet which engage said junction-member, and curved surfaces between said feet.

4. The combination with an electric cable and the armor thereof, of a hollow metallic member associated with said cable, a thimble surrounding said cable and its armor, said armor being doubled back over said thimble and lashed to the cable, and a collar encircling said armor and thimble, and having a restricted neck, and means for securing said collar, and thereby said thimble and armor to said member.

In witness whereof, I, hereunto subscribe my name this 7th day of February A. D., 1911.

HENRY C. EGERTON.

Witnesses:
IRVING MACDONALD,
MORGAN WASHBURN, Jr.